(12) United States Patent
Tanaka et al.

(10) Patent No.: US 6,921,797 B2
(45) Date of Patent: Jul. 26, 2005

(54) METHOD OF REDUCING METAL CONTENT IN FLUORINE-CONTAINING ELASTOMER

(75) Inventors: Yoshiyuki Tanaka, Settsu (JP); Masanori Kitaichi, Settsu (JP); Tomizo Sota, Settsu (JP); Tatsuya Morikawa, Settsu (JP); Toshio Sogabe, Settsu (JP); Mitsuru Kishine, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 3 days.

(21) Appl. No.: 10/759,282

(22) Filed: Jan. 20, 2004

(65) Prior Publication Data

US 2004/0147698 A1 Jul. 29, 2004

Related U.S. Application Data

(62) Division of application No. 09/646,969, filed as application No. PCT/JP99/01517 on Mar. 24, 1999, now Pat. No. 6,703,461.

(30) Foreign Application Priority Data

Mar. 25, 1998 (JP) ............................................. 10-77235
Jan. 12, 1999 (JP) ............................................. 11-5877

(51) Int. Cl.$^7$ ............................................. C08F 114/18
(52) U.S. Cl. ............................ 526/62; 526/78; 526/242; 526/247; 526/250; 526/255
(58) Field of Search ............................ 526/62, 78, 242, 526/247, 250, 255

(56) References Cited

U.S. PATENT DOCUMENTS

| | | |
|---|---|---|
| 3,635,926 A | 1/1972 | Gresham et al. |
| 3,855,191 A | 12/1974 | Doughty, Jr. et al. |
| 4,743,658 A | 5/1988 | Imbalzano et al. |
| 5,237,049 A | 8/1993 | Cavanaugh et al. |
| 5,546,182 A | 8/1996 | Sota |
| 5,804,744 A | 9/1998 | Tan et al. |
| 6,277,464 B1 | 8/2001 | Ronan et al. |

FOREIGN PATENT DOCUMENTS

| | | |
|---|---|---|
| EP | 0 708 797 B1 | 5/1996 |
| GB | 1030567 | 5/1966 |
| JP | 37-12536 | 8/1962 |
| JP | 51-31789 | 3/1976 |
| JP | 55-29519 | 1/1980 |
| JP | 59-59764 | 4/1984 |
| JP | 60-240713 | 11/1985 |
| JP | 62-285906 | 12/1987 |
| JP | 1-197510 | 8/1989 |
| JP | 7-179508 | 7/1995 |
| JP | 9-500163 | 1/1997 |
| JP | 9-183812 | 7/1997 |
| WO | WO 97/08239 | 3/1997 |

OTHER PUBLICATIONS

Supplementary Partial European Search Report for EP 99 90 9336 dated Oct. 8, 2004.
English translation of International Preliminary Examination Report for PCT/JP99/01517 dated Apr. 19, 2000.
International Search Report for PCT/JP99/01517 dated Jul. 6, 1999.

*Primary Examiner*—Bernard Lipman
(74) *Attorney, Agent, or Firm*—Sughrue Mion, PLLC (57) ABSTRACT

To provide a method of reducing contents of metal components of a fluorine-containing elastomer through preparation thereof and a molded article obtained from the fluorine-containing elastomer having sufficiently reduced contents of metal components. The method of reducing a metal content of the fluorine-containing elastomer through preparation thereof without using a metal oxide, in which among materials excluding a gaseous monomer which are used for polymerization of a fluorine-containing monomer, coagulation and drying, at least one of them contains substantially no metal component, and the fluorine-containing elastomer which has a metal content of not more than 50 ppm and is obtained by that method.

5 Claims, 1 Drawing Sheet

METHOD OF REDUCING METAL CONTENT IN FLUORINE-CONTAINING ELASTOMER

CROSS REFERENCE TO RELATED APPLICATIONS

This is a Divisional of application Ser. No. 09/646,969 filed Sep. 25, 2000, now U.S. Pat. No. 6,703,461, which is a 371 of PCT Application No. PCT/JP99/01517 filed Mar. 24, 1999, incorporated herein by reference.

TECHNICAL FIELD

The present invention relates to a process for preparing a fluorine-containing elastomer having a reduced metal content, and further relates to the fluorine-containing elastomer obtained by the process, a composition containing the fluorine-containing elastomer and a molded article obtained from the composition.

BACKGROUND ART

Fluorine-containing resins (plastics) have been used in a large amount for important parts such as chemical pipe, square tank and basket for silicon wafer which have a direct influence on semiconductor products in the semiconductor production process where strict requirements for cleanliness are demanded. Therefore reduction of contents of metal components, TOC (total organic carbon) and particle impurity in the fluorine-containing resins has been attempted positively.

Also with respect to fluorine-containing elastomers comprising mainly a vinylidene fluoride (VdF) unit or tetrafluoroethylene (TFE) unit, as they are called fluorine-containing rubbers, they are used in the field of rubber and treatments employed in that field are applied thereto. Thus handling thereof including vulcanization treatment differs largely from that in the field of fluorine-containing resin. Actually when the elastomer is used for a composition for vulcanization, since a filler, vulcanizing agent, vulcanization accelerator, acid acceptor, etc. are added thereto and since a major application of a rubber material is a sealing material and a contact portion thereof with chemicals is limited to a very small area unlike the chemical pipe, square tank and basket, there have been almost no problem particularly with purity of the fluorine-containing elastomer and presence of impurities.

On the other hand, an attention has been attracted recently to the fluorine-containing elastomer as a sealing material for semiconductor production apparatuses which is used under critical environment in the field of production of semiconductors from the viewpoint of excellent chemical resistance, solvent resistance and heat resistance thereof.

However in the field of production of semiconductors, reduction of cost of semiconductor chips has been advanced rapidly because of high integration and enhancement of yield, and as a result, a sealing material used on semiconductor production apparatuses is strongly required not to contain metal components, TOC and particles and not to release them in the semiconductor production apparatuses (so-called "cleaning" of a sealing material). Therefore it is not enough to employ only a conventional method of washing the sealing material with various solvents.

For example, JP-B-59-46985 discloses a sealing material produced by molding a composition containing a fluorine-containing elastomer by using a peroxide as a vulcanizing agent without adding a metal compound as an acid acceptor, and JP-A-9-500163 discloses a sealing material produced by molding a composition prepared by using an organic acid acceptor without using a metal oxide as an inorganic acid acceptor. However only by those approaches for cleaning during vulcanization, a metal content in the fluorine-containing elastomer used for those sealing materials cannot be reduced sufficiently. Also it has become necessary to take measures against metal ingredients contained in the fluorine-containing elastomer because the sealing materials are used in a plasma atmosphere causing a reduction of weight or in an environment where an abrasion of the sealing material represented by a gate valve arises due to open-close operations.

Further according to a technique described in JP-A-9-500163, O-ring having a reduced metal content is intended to be obtained by extracting a metal component through a specific method after it is produced by molding a composition containing a fluorine-containing elastomer through usual method. However even if such an extra step is employed, since the fluorine-containing elastomer itself is prepared through a conventional method, the content of metal component being present therein is absolutely much and as a result, cannot be reduced sufficiently.

On the other hand, JP-A-8-506604 describes a technique for vulcanizing by irradiating electron beams without using a metal compound. However the vulcanized product still contains a metal component which seems to be attributable to a coagulating agent, in an order of 100 ppm.

Namely a conventional fluorine-containing elastomer may contain metal components substantially because metal compounds such as a polymerization initiator and coagulating agent are used for preparation thereof. Also since metal compounds such as a vulcanizing agent, vulcanizing accelerator, acid acceptor and filler are used for producing a sealing material from such a fluorine-containing elastomer, the sealing material contains metal components and further particles are present on its surface.

Also conventional evaluation of content of metal components is made with an amount of elution under a specific elution (extraction) conditions, and therefore a present situation is such that under different treating conditions, an amount of elution also differs remarkably.

Such being the case, a fluorine-containing elastomer being capable of complying with every environment and treatment and having substantially reduced metal components therein and a sealing material produced from the fluorine-containing elastomer and having a sufficiently reduced content of metal components have not yet been obtained.

In view of the above-mentioned fact, an object of the present invention is to provide a method of substantially reducing a content of metal components inside of the fluorine-containing elastomer in the preparation thereof, and further as a result, to provide a molded article, particularly a sealing material produced from the fluorine-containing elastomer having a sufficiently reduced content of metal components.

DISCLOSURE OF INVENTION

The present invention relates to the method of reducing a metal content of a fluorine-containing elastomer through preparation thereof, in which a metal compound is not blended during emulsion-polymerization of a fluorine-containing monomer.

Further the present invention relates to the method of reducing a metal content of a fluorine-containing elastomer through preparation thereof without using a metal compound, in which among materials excluding a gaseous monomer which are used for polymerization of a fluorine-containing monomer, coagulation and drying, at least one material contains substantially no metal component.

In that case, it is preferable that the material used for polymerization of a fluorine-containing monomer, coagulation and drying is water for a polymerization medium.

Also it is preferable that the material used for polymerization of a fluorine-containing monomer, coagulation and drying is a coagulating agent for coagulation.

Further it is preferable that the material used for polymerization of a fluorine-containing monomer, coagulation and drying is a non-water-soluble solvent which has compatibility with the fluorine-containing elastomer containing water and is added when separating water from the coagulated fluorine-containing elastomer containing water.

Further the present invention relates to the method of reducing a metal content of a fluorine-containing elastomer through preparation thereof, in which emulsion-polymerization of the fluorine-containing elastomer is carried out while maintaining an emulsion in a weak alkaline state.

Further the present invention relates to the method of reducing a metal content of a fluorine-containing elastomer through preparation thereof, in which coagulation is carried out after an emulsified dispersion of the fluorine-containing elastomer is filtrated to remove contaminants.

Further the present invention relates to the method of reducing a metal content of a fluorine-containing elastomer through preparation thereof, in which coagulation of an emulsified dispersion of the fluorine-containing elastomer is carried out by using an acid containing no metal element.

Further the present invention relates to the method of reducing a metal content of a fluorine-containing elastomer through preparation thereof, in which to the fluorine-containing elastomer containing water obtained by coagulation of an emulsified dispersion of the fluorine-containing elastomer is added a non-water-soluble solvent having compatibility with the fluorine-containing elastomer containing water to separate the water therefrom.

Further the present invention relates to the method of reducing a metal content of a fluorine-containing elastomer through preparation thereof, in which a clean gas is used for drying a fluorine-containing elastomer containing water obtained by coagulation of an emulsified dispersion of the fluorine-containing elastomer or, a coagulated elastomer obtained by adding, to the fluorine-containing elastomer containing water, a non-water-soluble solvent having compatibility therewith to separate the water therefrom.

Further the present invention relates to the method of reducing a metal content of a fluorine-containing elastomer through preparation thereof, in which a vessel laminated with a fluorine-containing resin film or polyethylene film on its part coming into contact with the coagulated elastomer, a vessel made of a fluorine-containing resin or a vessel made of polyethylene resin is used.

Further the present invention relates to the method of reducing a metal content of a fluorine-containing elastomer which comprises at least two of the above-mentioned methods.

Further the present invention relates to the method of reducing a metal content of a fluorine-containing elastomer through preparation thereof without using a metal compound, in which the elastomer is prepared by using materials containing substantially no metal component as all the materials used for polymerization of a fluorine-containing monomer, coagulation and drying, by employing an equipment, a part of which comes into contact with an emulsion, emulsified dispersion or coagulated fluorine-containing elastomer containing water and is made of or lined with a fluorine-containing resin or polyethylene resin, and by drying with a clean gas.

The present invention relates to the fluorine-containing elastomer having a metal content of not more than 50 ppm, preferably not more than 10 ppm, more preferably not more than 1 ppm.

Also the present invention relates to the fluorine-containing elastomer having a metal content of not more than 50 ppm, preferably not more than 10 ppm, which is obtained by one of the above-mentioned methods or by a combination of two or more thereof.

In that case it is preferable that the fluorine-containing elastomer comprises 40 to 90% by mole of tetrafluoroethylene, 10 to 60% by mole of perfluorovinylether represented by the formula (1):

$$CF_2=CF-OR_f$$

wherein $R_f$ is a perfluoroalkyl group having 1 to 5 carbon atoms or a perfluoroalkyl(poly)ether group having 3 to 12 carbon atoms and 1 to 3 oxygen atoms, and 0 to 5% by mole of monomer giving a curing site.

Also it is preferable that the above-mentioned fluorine-containing elastomer comprises 30 to 85% by mole of vinylidene fluoride, 15 to 40% by mole of hexafluoropropylene and 0 to 30% by mole of tetrafluoroethylene.

Also it is preferable that the above-mentioned fluorine-containing elastomer comprises 10 to 90% by mole of vinylidene fluoride, 10 to 40% by mole of perfluorovinylether represented by the formula (1): $CF_2=CF-OR_f$, wherein $R_f$ is as defined above, and 0 to 80% by mole of tetrafluoroethylene.

Also it is preferable that the above-mentioned fluorine-containing elastomer comprises 40 to 90% by mole of vinylidene fluoride, 3 to 35% by mole of perfluoro(methyl vinyl ether) (PMVE), 0 to 25% by mole of hexafluoropropylene, 0 to 40% by mole of tetrafluoroethylene, and 0.005 to 1.5% by mole of iodine-containing monomer (IM) as the monomer giving a curing site (cf. WO96/17877). As the iodine-containing monomer, iodine-containing fluorinated vinyl ethers represented by the formula (4): $I(CH_2CF_2CF_2O)m[CF(CF_3)CF_2O]nCF=CF_2$, wherein m is an integer of 1 to 5, n is 0 or an integer of 1 to 3, can be used preferably.

Also it is preferable that the above-mentioned fluorine-containing elastomer is a fluorine-containing multi-segment polymer having an elastomeric fluorine-containing polymer chain segment and a non-elastomeric fluorine-containing polymer chain segment; the elastomeric fluorine-containing polymer chain segment comprises 40 to 90% by mole of tetrafluoroethylene, 10 to 60% by mole of perfluorovinylether represented by the formula (1):

$$CF_2=CF-OR_f$$

wherein $R_f$ is as defined above, and 0 to 5% by mole of monomer giving a curing site, and the non-elastomeric fluorine-containing polymer chain segment comprises 85 to 100% by mole of tetrafluoroethylene and 0 to 15% by mole of the formula (2):

$$CF_2=CF-R_f^1$$

wherein $R_f^1$ is $CF_3$ or $OR_f^2$, in which $R_f^2$ is a perfluoroalkyl group having 1 to 5 carbon atoms.

Also it is preferable that each of the above-mentioned fluorine-containing elastomers contains a polymer chain having iodine and/or bromine at its end and/or side chain.

Also it is preferable that the above-mentioned fluorine-containing elastomers have nitrile group.

Further the present invention relates to the composition containing the above-mentioned fluorine-containing elastomer.

Further the present invention relates to the molded article obtained from the above-mentioned composition.

The present invention also relates to the molded article having a metal content of not more than 50 ppm, preferably not more than 10 ppm.

It is preferable that the above-mentioned molded article is a sealing material for semiconductor production apparatuses.

Further the present invention relates to the method of reducing a metal content of the fluorine-containing polymer through preparation thereof, in which equipment lined with a fluorine-containing resin on its portion coming into contact with materials for polymerization and a produced polymer is used.

In that case, it is preferable that the equipment lined with a fluorine-containing resin is a polymerizing equipment such as a polymerization vessel and agitation blades and baffle plates thereof, coagulation equipment, washing equipment, drying equipment or pipes thereof.

Also it is preferable that the fluorine-containing resin is tetrafluoroethylene/perfluoro(alkyl vinyl ether) copolymer (PFA).

BEST MODE FOR CARRYING OUT THE INVENTION

Figure 1:
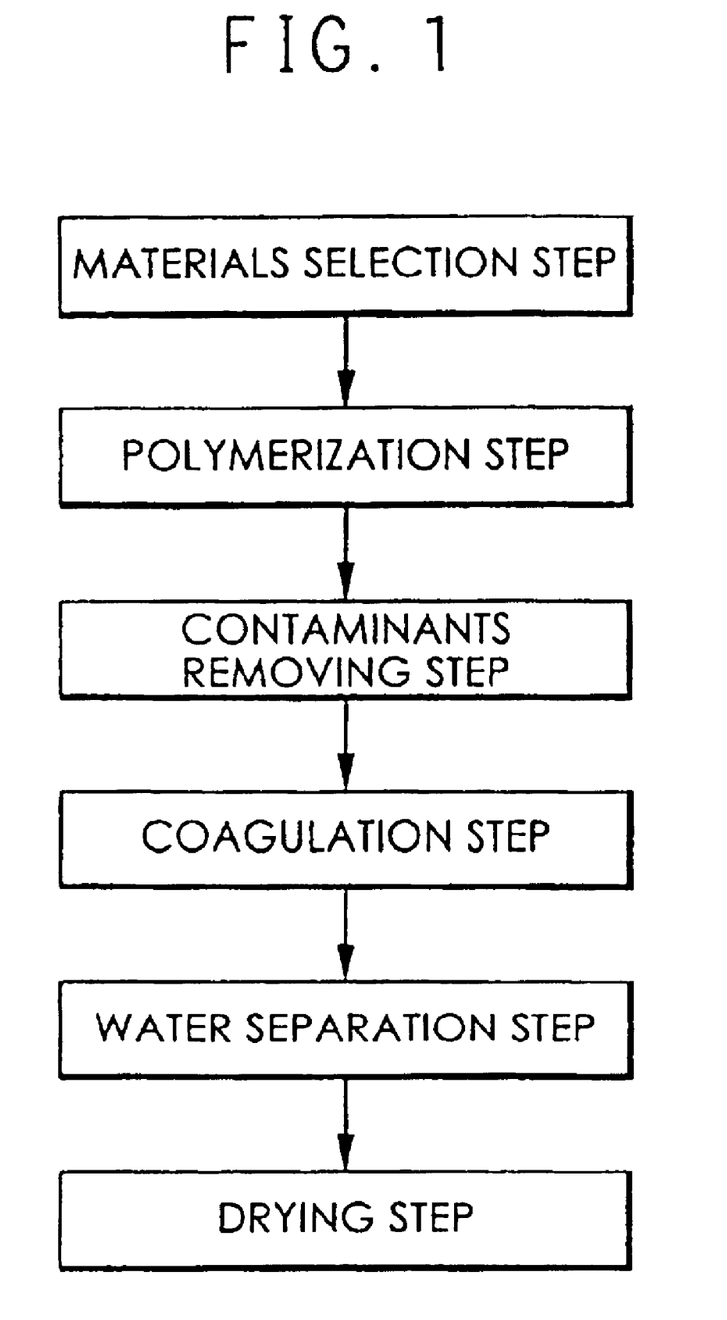
FIG. 1 is a flow chart for explaining a process for preparing the fluorine-containing elastomer of the present invention.

Firstly a flow chart for explaining each step of the process for preparing the fluorine-containing elastomer which the method of the present invention for reducing a metal content of the fluorine-containing elastomer is based on is shown in FIG. 1. The method of the present invention is explained below in order of the steps for preparation of the fluorine-containing elastomer shown in FIG. 1.

First of all, in the preparation of the fluorine-containing elastomer according to the present invention, a metal compound is not blended during emulsion-polymerization of a fluorine-containing monomer.

Namely the present invention relates to the method of reducing a metal content of the fluorine-containing elastomer, in which a metal compound is not blended during emulsion-polymerization of a fluorine-containing monomer.

In conventional processes for preparing a fluorine-containing elastomer, materials containing metal atom, i.e. polymerization initiators such as potassium persulfate, sodium sulfite and ferrous sulfate have been used usually, and therefore metal components were contained in the obtained fluorine-containing elastomer. On the contrary, particularly in order to solve the above-mentioned problem, the present invention is characterized in that compounds containing no metal atom are used as all the materials and further "a material containing substantially no metal component" is used as at least one of the materials.

In the present invention, "containing substantially no metal components" means that no metal compound is used as a matter of course and in addition, metal compounds as impurities are eliminated thoroughly. Concretely it means that a content of metal components of the materials is not more than 20 ppb, preferably not more than 10 ppb.

In the present invention, metal components are Na, K, Fe, Ni, Al, Cu, Cr, Zn, Ca and Mg, the content of which is measured by the method mentioned hereinafter.

In the present invention, materials are a fluorine-containing monomer, water, emulsifying agent, chain transfer agent such as iodine compound, polymerization initiator, pH control agent such as ammonia, coagulating agent, and the like. Among them, it is important to use a fluorine-containing monomer, emulsifying agent, iodine compound, polymerization initiator and coagulating agent which do not contain metal in constitutive atoms thereof.

As the fluorine-containing monomers to be used in the present invention, conventional fluorine-containing monomers may be used. From the viewpoint of stability and non-staining property of the fluorine-containing elastomer, preferred are tetrafluoroethylene (TFE), vinylidene fluoride (VdF), hexafluoropropylene (HFP) and perfluorovinylethers represented by the formula (1): $CF_2=CF-OR_f$, wherein $R_f$ is a perfluoroalkyl group having 1 to 5 carbon atoms or a perfluoroalkyl(poly)ether group having 1 to 3 oxygen atoms and 3 to 12 carbon atoms.

Also other monomers may be contained in the elastomer as far as an effect of the present invention and properties of the elastomer are not lowered. Examples of the usable other monomer are, for instance, propylene (pr) giving curability, iodine-containing fluorinated vinyl ether imparting compression set and represented by the formula (4): $I(CH_2CF_2CF_2O)m[CF(CF_3)CF_2O]nCF=CF_2$, wherein m is an integer of 1 to 5, n is 0 or an integer of 1 to 3, iodinated olefins disclosed in JP-A-7-316246 and represented by the formula (5):

wherein X is hydrogen atom, fluorine atom or methyl group, R is hydrogen atom or methyl group, $R_f^2$ is a linear or branched fluoro- or perfluoro-alkylene group or fluoro- or perfluoro-oxyalkylene group which may have at least one ether type oxygen atom, and the like. In addition, there are $CF_2=CHI$, perfluoro(5-iodo-3-oxa-1-pentene), and the like. Further there are the following functional group-containing monomers for enhancing heat resistance.

in which m is 0 or an integer of 1 to 5, n is an integer of 1 to 3, in which n is an integer of 1 to 4, in which n is an integer of 2 to 5, in which n is an integer of 1 to 6, $$CF_2=CF(OCF_2CF(CF_3))_nOCF_2CF(CF_3)CN$$

in which n is 1 or 2, or

Preferred combinations of monomers are TFE/PAVE, VdF/HFP, VdF/TFE/HFP, VdF/PAVE/TFE, VdF/PMVE, VdF/HFP/PMVE, VdF/TFE/PMVE, VdF/PMVE/HFP/TFE and TFE/Pr/other monomer. Proportions of TFE/PAVE, VdF/TFE/HFP and VdF/PAVE/TFE are preferably 40 to 90/10 to 60 (% by mole), 30 to 85/0 to 30/15 to 40 (% by mole) and 10 to 90/10 to 40/0 to 80 (% by mole), respectively. Also proportions of VdF/PMVE, VdF/HFP/PMVE, VdF/TFE/PMVE and VdF/PMVE/HFP/TFE are preferably 65 to 90/10 to 35 (% by mole), 65 to 90/3 to 25/3 to 25 (% by mole), 40 to 80/3 to 40/15 to 35 (% by mole) and 40 to 80/3 to 25/3 to 25/3 to 40 (% by mole), respectively. Also a proportion of TFE/Pr/other monomer is preferably 40 to 70/30 to 60/0 to 20 (% by mole).

Also for the fluorine-containing elastomer to be used in the present invention, there may be used a fluorine-containing multi-segment elastomer described in Japanese Patent Application No.304684/1997 as a molding material to be suitably used for molding into various molded articles required to have sealing property and cleanliness. Preferred combination of monomers and proportion thereof for the elastomeric fluorine-containing polymer chain segment are TFE/PAVE/monomer giving a curing site (45 to 90/10 to 50/0 to 5, % by mole, hereinafter the same), preferably 45 to 80/20 to 50/0 to 5, especially 53 to 70/30 to 45/0 to 2. Combinations of monomers and proportions thereof for the non-elastomeric fluorine-containing polymer chain segment are:

(1) VdF/TFE (0 to 100/100 to 0), particularly VdF/TFE (70 to 99/30 to 1), PTFE or PVdF;
(2) ethylene/TFE/HFP (6 to 60/40 to 81/1 to 30), 3,3,3-trifluoropropylene-1,2-trifluoromethyl-3,3,3-trifluoropropylene-1/PAVE (40 to 60/60 to 40);
(3) TFE/CF$_2$=CF—R$_f^1$ (amount exhibiting non-elastomeric property, namely not more than 15% by mole of CF$_2$=CF—R$_f^1$);
(4) VdF/TFE/CTFE (50 to 99/30 to 0/20 to 1);
(5) VdF/TFE/HFP (60 to 99/30 to 0/10 to 1);
(6) ethylene/TFE (30 to 60/70 to 40);
(7) polychlorotrifluoroethylene (PCTFE);
(8) ethylene/CTFE (30 to 60/70 to 40); and the like.

Water to be used in the present invention may be one which have a metal content in the above-mentioned range. Particularly it is preferable to use ultra pure water containing a very small amount of metal and TOC.

Water to be used in the present invention and "containing substantially no metal component" can be prepared by a continuous process of known methods, i.e. membrane separation methods such as reverse osmosis (RO), ultrafiltration (UF) and microfilter (MF), ion exchange resin method, activated carbon adsorption method, UV oxidation method, and the like including a continuous multistage process thereof.

Example of the process for preparing ultra pure water is the following process.

① Pre-treatment system (industrial water, underground water→pre-treated water): Pre-treatment is carried out for removal of turbidity and primary sterilization. Means to be used are coagulation to sedimentation, agglomeration to filtration, adsorption with activated carbon and microfilter (MF).

② Primary pure water system (pre-treated water→primary pure water): This is carried out for dechlorination. Means to be used are reverse osmosis (RO) for removal of most of dissolved minerals, organic substances, fine particles and bacteria and ion exchange resin for precise desalting.

③ Sub-system (primary pure water→ultra pure water): This is carried out for removal of ions and fine particles in the primary pure water and for sterilization. Means to be used are UV oxidation for decomposing organic substances, ultrafiltration (UF) for removal of colloidal substances and high molecular substances, and ion exchange resin for precise desalting.

An emulsifying agent to be used in the present invention is not limited particularly as far as it contains no metal atom. For example, preferred are salts of carboxylic acid having a fluorocarbon chain or fluoropolyether chain from the viewpoint of inhibiting a chain transfer reaction with molecules of the emulsifying agent which occurs during the polymerization.

Examples thereof are, for instance, ammonium perfluorooctanoate, CF$_3$(CF$_2$)$_n$COONH$_4$ (n=7 to 8), CHF$_2$(CF$_2$)$_n$COONH$_4$ (n=6 to 8), C$_3$F$_7$OCF(CF$_3$)CF$_2$OCF(CF$_3$)COONH$_4$, and the like.

An amount of the emulsifying agent is preferably from about 0.05% by weight to about 10% by weight, especially 0.2 to 5.0% by weight based on added water.

The iodine compound to be used in the present invention as a chain transfer agent contains no metal atom. Examples thereof are, for instance, 1,3-diiodoperfluoropropane, 1,4-diiodoperfluorobutane, 1,3-diiodo-2-chloroperfluoropropane, 1,5-diiodo-2,4-dichloroperfluoropentane, 1,6-diiodoperfluorohexane, 1,8-diiodoperfluoroperfluorooctane, 1,12-diiodoperfluoroperfluorododecane, 1,16-diiodoperfluoroperfluorohexadecane, diiodomethane, 1,2-diiodoethane, and the like. Those compounds can be used solely or in optional combination thereof. Among them, 1,4-diiodoperfluorobutane is used preferably. An amount of the iodine compound affects a molecular weight of polymer, and is usually from 0.01 to 5% by weight based on the polymer.

In the present invention, when carrying out the polymerization by using only monomers in the gaseous form at normal temperature at normal pressure (for example, tetrafluoroethylene, vinylidene fluoride, hexafluoropropylene, perfluoromethyl, perfluorovinylether, and the like), there may be used a method of charging pure water and emulsifying agent, carrying out deoxidation treatment and then charging necessary gaseous monomers like conventional method. On the other hand when carrying out polymerization by using a monomer in the liquid form at normal temperature at normal pressure, especially by using, for example, a fluorine-containing monomer represented by the formula (3): CF$_2$=CF(OCF$_2$CF(CF$_3$))$_2$OCF$_2$CF$_2$CF$_3$ as perfluoro(alkyl vinyl ether), it is preferable to firstly obtain an emulsion by mixing the fluorine-containing monomer, other monomer, pure water, emulsifying agent, and iodine compound as a chain transfer agent. In that case, it is more preferable to carry out pre-emulsification firstly and then emulsification forcedly at high pressure.

Then in the present invention, polymerization of the fluorine-containing monomer is carried out to prepare an emulsified dispersion.

A polymerization initiator to be used is not limited particularly as far as it contains no metal atom. Examples thereof are, for instance, organic and inorganic peroxides and azo compounds. Represented examples thereof are persulfate, carbonate peroxide, peroxyester, and the like. Among them, preferred is ammonium persulfate (APS). APS may be used solely or in combination with a reducing agent (containing no metal atom) such as sulfite.

Also in that case, mixing of metal components can be prevented by emulsion-polymerizing the fluorine-containing monomer while maintaining the emulsion in a weak alkaline state.

Accordingly the present invention also relates to the method of reducing a metal content of the fluorine-containing elastomer through preparation thereof, in which emulsion-polymerization of the fluorine-containing monomer is carried out while maintaining the emulsion in a weak alkaline state.

Particularly in case where the fluorine-containing elastomer is prepared by emulsion-polymerization of a fluorine-containing monomer, there is a possibility that fluorine ions are generated during the polymerization, which accelerates elution of metal components of a polymerization equipment and the metal components are mixed to the polymer, thereby causing contamination of the polymer.

Therefore in the present invention, emulsion-polymerization of the fluorine-containing monomer is carried out while maintaining the emulsion in a weak alkaline state to neutralize fluorine ions generated during the polymerization.

As a method for maintaining the emulsion in a weak alkaline state, there is a method of adding an ammonia compound such as ammonia water, ammonium carbonate, or the like as a pH control agent from the viewpoint of not using a metal compound.

In the above method, "weak alkaline" means pH of from about 7 to about 10.

The pH control agent may be mixed simultaneously with components such as a fluorine-containing monomer when preparing the emulsion.

In the present invention, in case of combination use of monomers, particularly when a gas mixture comprising tetrafluoroethylene and perfluoro(methyl vinyl ether) is used, since the gas mixture is explosive as described in Advances in Chemistry Series, G. H. Kalb et al, 129, 13 (1973), it is necessary to take measures for a polymerization equipment not to cause a sparking. From that point of view, it is preferable that a polymerization pressure is as low as possible.

A polymerization temperature may be a temperature used for usual emulsion-polymerization, and from the viewpoint of stabilization of polymer radicals, it is preferably from 5° to 100° C.

The polymerization pressure can be changed in a wide range, generally lower than 7 MPa. The higher the polymerization pressure is, the more a polymerization speed increases. Therefore the polymerization pressure is preferably not less than 0.1 MPa from the viewpoint of increasing productivity.

It is preferable that inner surfaces of the polymerization equipment including a polymerization tank, agitation blades and baffle plate thereof, coagulation equipment, washing equipment, drying equipment and pipes thereof, particularly parts of the inner surfaces coming into contact with the emulsion and polymer (water-containing polymer, solvent-containing polymer, dried polymer) are lined with a fluorine-containing resin, particularly tetrafluoroethylene/perfluoro(alkyl vinyl ether) copolymer (PFA) from the viewpoint of inhibiting elution of metal components. The lining may be carried out by usual method. Also in that case, there is a merit that it is not necessary to remove a pH control agent such as an ammonia compound to be added for adjusting to weak alkaline state.

In the present invention then the emulsified dispersion obtained by the above-mentioned emulsion-polymerization is subjected to coagulation to give a fluorine-containing elastomer containing water.

Accordingly the present invention relates to the method of reducing a metal content of the fluorine-containing elastomer through preparation thereof, in which the coagulation of the emulsified dispersion of fluorine-containing elastomer is carried out by using an acid containing no metal element as a coagulating agent.

The coagulating agent to be used in the present invention is not limited particularly as far as it is a usual one containing no metal atom. Examples thereof are, for instance, usual acids such as hydrochloric acid, nitric acid, hydrofluoric acid, sulfuric acid and trifluoroacetic acid. From the point that they are widely used for general purposes and can be made highly pure and from the viewpoint of its amount to be used, it is preferable to use hydrochloric acid, nitric acid and sulfuric acid.

Further in the present invention, it is preferable to use an acid of highly pure grade for semiconductor production among the above-mentioned coagulating agents "containing substantially no metal component".

Thereby an effect that an amount of metal components to be mixed in the polymer can be reduced is obtained.

For the coagulation of the emulsified dispersion of fluorine-containing elastomer, a method for coagulation by freezing can also be employed though that method is inferior in productivity.

In the present invention it is preferable that in the preparation of the fluorine-containing elastomer, before the emulsified dispersion of fluorine-containing elastomer is subjected to coagulation, impurity substances are removed from the emulsified dispersion (impurity substance removing step).

Thus the present invention relates to the method of reducing a metal content of the fluorine-containing elastomer through preparation thereof, in which the coagulation is carried out after impurity substances are removed from the emulsified dispersion of fluorine-containing elastomer.

In the preparation of the fluorine-containing elastomer, removing impurity substances by washing, etc. after the coagulation step is inferior in an efficiency and is difficult from practical point of view. Therefore it is preferable to remove impurity substances by washing before the coagulation step.

The impurity substances mean not only metal components but also a polymerization initiator, pH control agent, starting monomer, emulsifying agent, residues thereof, low molecular weight polymer resulting from the starting monomer, and the like. The reason why not only metal components but also the above-mentioned residues are removed is to decrease an amount of acids to be used in the coagulation step and omit the step for washing a coagulated elastomer. This is because in order to pulverize the fluorine-containing elastomer containing water and acids, it is necessary to use metal blades or the like having a pulverizing force, thereby causing elution of metal ingredients and mixing thereof.

As a method for removing impurity substances, it is preferable to carry out washing by filtration with a semipermeable membrane. Concretely after the emulsified dispersion of fluorine-containing elastomer is concentrated by filtration, the concentrated dispersion is diluted with ultra pure water, or the like, and thus the concentration and dilution may be repeated.

As means for the filtration, there are a semi-permeable membrane, particularly a ceramic filter, and the like which are hard to cause elution of metal components. Thereby a good washing effect can be obtained.

Then in the present invention, to the fluorine-containing elastomer containing water which is obtained by coagulating the emulsified dispersion of fluorine-containing elastomer, is added a non-water-soluble solvent having compatibility with the fluorine-containing elastomer containing water to separate the water (water separating step).

Accordingly the present invention relates to the method of reducing a metal content of the fluorine-containing elastomer through preparation thereof, in which to the fluorine-containing elastomer containing water which is obtained by coagulating the emulsified dispersion of fluorine-containing elastomer, is added a non-water-soluble solvent having compatibility with the fluorine-containing elastomer containing water (hereinafter also referred to simply as "non-water-soluble solvent") to separate the water.

In the process of the present invention, a step for obtaining the fluorine-containing elastomer containing water by coagulating the emulsified dispersion of fluorine-containing elastomer may be carried out by using a conventional treating method except that the above-mentioned coagulating agent is used. However if the obtained fluorine-containing elastomer containing water is dried as it is like conventional method, metal components, TOC, particles, coagulating agent, etc. which may be contained in water of the fluorine-containing elastomer containing water may remain in the elastomer. Therefore in the present invention, water is separated from the fluorine-containing elastomer containing water before the drying is carried out.

In the present invention, the step for separation of water from the fluorine-containing elastomer containing water which is obtained by coagulating the emulsified dispersion of fluorine-containing elastomer is carried out by adding, to the fluorine-containing elastomer containing water, a non-water-soluble solvent having compatibility therewith. Further an effect of water separation is increased by repeating this step.

Examples of the non-water-soluble solvent are, for instance, 1,1-dichloro-1-fluoroethane (HCFC-141 b), 1,1,1,2,2-pentafluoro-3,3-dichloropropane (HCFC-225ca), 1,1,2,2,3-pentafluoro-1,3-dichloropropane (HCFC-225cb), perfluorohexane, perfluoro(1-chloro-4-hydrobutane), and the like. Among them, it is preferable to use HCFC-141b from the viewpoint of easiness of its removal in the following step. Also it is important that the solvent contains no metal component. Thereby an effect of making it possible to remove water-soluble substances can be obtained.

Then in the present invention, a clean gas is used for drying the fluorine-containing elastomer containing water obtained by coagulating the emulsified dispersion of fluorine-containing elastomer or a coagulated elastomer obtained by separating water by adding, to the fluorine-containing elastomer containing water, a non-water-soluble solvent having compatibility therewith (drying step). Namely the present invention also relates to the method of reducing a metal content of the fluorine-containing elastomer through preparation thereof, in which a clean gas is used for drying the fluorine-containing elastomer containing water obtained by coagulating the emulsified dispersion of fluorine-containing elastomer.

In conventional process for preparing the fluorine-containing elastomer, when the fluorine-containing elastomer containing water is dried, a normal air is used. However since the normal air contains particles such as $SiO_2$ and metals, those particles adhere to the surface of the fluorine-containing elastomer after the drying. So in the present invention, the fluorine-containing elastomer is dried with a clean gas. Also it is preferable that the drying is carried out under reduced pressure.

The clean gas in the present invention means a gas having 10,000 or less, preferably 100 or less particles of not less than 0.2 $\mu$m.

Kind of the usable gas is not limited particularly. Examples thereof are, for instance, inert gases such as air, nitrogen and argon. It is preferable to use nitrogen gas, argon gas or air treated with a chemical filter from the viewpoint of removing TOC sources and ammonia compound contained in a normal air.

For obtaining a clean gas, a PTFE filter usually employed and a HEPA filter are used generally.

Thereby there can be obtained an effect that a reduction of particles and reduction of a metal content can be achieved.

As mentioned above, in the present invention, a metal content of the fluorine-containing elastomer can be reduced by one of the above-mentioned methods though an amount of reduction varies depending on the method. Also by combining optionally two or more of the methods, the metal content can be reduced more and the reduction of the metal content can be achieved more securely. Namely the present invention relates to the method of reducing a metal content of the fluorine-containing elastomer which comprises at least two of the above-mentioned methods of reducing a metal content of the fluorine-containing elastomer.

In order to prepare the fluorine-containing elastomer having a metal content reduced remarkably to 1 ppm or less, it is necessary to design all the steps shown in FIG. 1 with a consistent concept of preventing mixing of metals. Particularly preferable examples is use of compounds containing no metal element as the materials to be used in all the steps and especially use of highly purified pure water and coagulating agent which come into much contact with the polymer. Also in the polymerization step and coagulation step, parts coming into contact with the emulsion and water-containing polymer are lined with a fluorine-containing resin PFA to inhibit mixing of metals. Also in the drying step, mixing of metals can be prevented by using a fluorine-containing resin film or a tray made of fluorine-containing resin for the parts contacting the polymer. For the drying, there are uses of clean air and inert gas containing no particle.

Also a molded article of fluorine-containing rubber obtained by adding a filler containing a very small amount of metal to the so-obtained clean fluorine-containing elastomer has a remarkably reduced metal content and also as a sealing material for semiconductor, exhibits a non-staining property which has not been obtained.

Thus the metal content of the so-obtained fluorine-containing elastomer can be reduced to 50 ppm or less, preferably 10 ppm or less, more preferably 1 ppm or less. Namely the present invention relates to the fluorine-containing elastomer having a metal content of 50 ppm or less, preferably 10 ppm or less. It should be noted here that a problem taken up by the present invention is an amount of metal contained in the fluorine-containing elastomer but not an amount of metal components (amount of elution) in an eluent (extracted solution). The latter has been used for conventional evaluation of the metal content. For example, when the metal content is evaluated by an amount of elution, even if the metal content is high, there is a case where the amount of elution is small depending on conditions of elution. In that case, if environment in use changes, there is a case where an amount of elution increases. Thus the evaluation by an amount of elution does not show cleanliness correctly. On the contrary, when the metal content is evaluated by a containing amount, no elution exceeding the metal content does not arise and proper evaluation can be made in various situations.

Further the present invention relates to the composition containing the fluorine-containing elastomer obtained as mentioned above. In that case, it is preferable that other components used together with the fluorine-containing elastomer which is obtained by the method of the present invention and has a reduced amount of metal components are those containing no metal atom so that a content of metal componnts of the obtained molded article, the number of particles on the surface thereof and an amount of TOC should not be increased.

Examples of the other component are a vulcanizing agent, vulcanization accelerator, filler, and the like.

Examples of the vulcanizing agent are, in case of an elastomer having iodine and/or bromine, for instance, organic peroxides such as dicumyl peroxide, benzoyl peroxide, 2,5-dimethyl-2,5-bis(t-butylperoxy)hexane, 2,5-dimethyl-2,5-bis(t-butylperoxy)hexine-3, bis(2,4-dichlorobenzoyl) peroxide, t-butylcumyl peroxide, t-butylperoxybenzene, 1,1-bis(t-butylperoxy)-3,5,5-trimethylcyclohexane, 2,5-dimethylhexane-2,5-dihydroxy peroxide, α,α'-bis(t-butylperoxy)-p-diisopropylbenzene, 2,5-dimethyl-2,5-di(benzoylperoxy)hexane and t-butylperoxyisopropyl carbonate; in case of an elastomer having nitrile group, for instance, bifunctional compounds such as 2,2-bis-(3-amino-4-hydroxyphenyl) hexafluoropropane, 2,2-bis-(3,4-diaminophenyl) hexafluoropropane and 2,2-bis(3-amino-4-mercaptophenyl) hexafluoropropane; and the like.

Also examples of the vulcanization accelerator are, in case of an elastomer having iodine and/or bromine, for instance, polyvalent allyl compounds such as triallylcyanurate, triallylisocyanurate (TAIC), triallyltrimellitate and diallylphthalate; fluorine-containing polyfunctional olefin compounds such as fluorine-containing triallylisocyanurate and olefins represented by $CH_2=CH(CF_2)_nCH=CH_2$ (n=2 to 6); and the like. Among them, triallylisocyanurate, fluorine-containing triallylisocyanurate and a combination thereof are preferred from the viewpoint of vulcanizability and physical properties of the obtained vulcanized article.

Examples of the filler are, for instance, inorganic fillers such as carbon black (particularly graphitized carbon black), silicon oxide and titanium oxide, organic fillers such as a fluorine-containing resin, and the like. Among them, from the viewpoint of cleanliness, it is preferable to use graphitized carbon black, high purity synthetic quartz silica, polytetrafluoroethylene, and the like.

The above-mentioned composition can be prepared by mixing each component by usual method. The vulcanization may be carried out by usual method.

In case of applications for semiconductor-related production apparatuses which strongly demand a non-staining property, it is preferable to carry out crosslinking with high energy rays without adding a crosslinking agent, etc. As a crosslinking source, radioactive rays such as α-rays, β-rays, γ-rays and X-rays, electron beams, ultraviolet rays, and the like are used.

With respect to high energy rays to be irradiated to a pre-molded article, for example, in case of electron beams, radiation thereof is preferably from 5 to 500 kGy, more preferably 10 to 300 kGy. When less than 5 kGy, an improvement in mechanical strength by irradiation of radioactive rays becomes insufficient, and when more than 500 kGy, decomposition of the polymer advances and a part of intermolecular bonds is cleaved to lower a mechanical strength of the molded article. For an improvement of mechanical strength, a radiation dose is preferably not less than 500 kGy/hr, more preferably not less than 1,000 kGy/hr.

Then the composition comprising the fluorine-containing elastomer of the present invention and the components mentioned above can be molded by usual method into molded articles for semiconductor production apparatuses, particularly parts for semiconductor production apparatuses which are required to have high cleanliness, for example, sealing materials such as O-ring, square ring, gasket, packing, oil seal, bearing seal and lip seal, tube, hose, various rubber rolls, diaphragm, and the like. Namely the present invention also relates to those molded articles. The composition can also be applied to lining and coating. Since the above-mentioned composition has a reduced content of not only metal components but also TOC and particles, the obtained molded article can be used suitably for various semiconductor production apparatuses.

In the present invention, the semiconductor production apparatuses are not limited particularly to equipment for producing semiconductors, but widely includes whole production apparatuses used in the field of semiconductor where high cleanliness is demanded, such as equipment for producing liquid crystal panel and plasma panel.

Examples of the semiconductor production apparatuses are as follows.
(1) Etching System
   Dry etching equipment
      Plasma etching device
      Reactive ion etching device
      Reactive ion beam etching device
      Sputter etching device
      Ion beam etching device
   Wet etching equipment
   Ashing equipment
(2) Cleaning System
   Dry etching cleaning equipment
      $UV/O_3$ cleaning device
      Ion beam cleaning device
      Laser beam cleaning device
      Plasma cleaning device
      Gas etching cleaning device
   Extraction cleaning equipment
      Soxhlet extracting cleaning device
      High temperature high pressure extracting cleaning device
      Micro wave extracting cleaning device
      Supercritical extracting cleaning device
(3) Exposing System
   Stepper
   Coater developer
(4) Polishing System
   CMP equipment
(5) Film Forming System
   CVD equipment
   Sputtering equipment
(6) Diffusion/Ion Implantation System
   Oxidation diffusion equipment
   Ion implantation equipment The present invention is then explained based on examples but is not limited to those examples.

EXAMPLE 1

(1) Materials Selection Step

Each component used are shown below. Also contents of metal components thereof are shown in Table 1.

Fluorine-containing monomer A: Tetrafluoroethylene (TFE)

Fluorine-containing monomer B: Perfluoro(alkyl vinyl ether) (PAVE) represented by $CF_3CF_2CF_2O(CF(CF_3)CF_2O)_2CF=CF_2$ Iodine-containing monomer: $ICH_2CF_2CF_2OCF=CF_2$(IM)

Iodine compound: 1,4-diiodoperfluorobutane (DI)

Emulsifying agent: Ammonium perfluorooctanoate. Contents of metal components in the emulsifying agent were 8,100 ppb of Fe, 600 ppb of Na and 200 ppb of K.

Polymerization initiator: Ammonium persulfate (APS)

pH control agent: Ammonium carbonate

Coagulating agent: Hydrochloric acid (Suprapur, HCl of semiconductor grade available from MERCK & CO., INC.). Contents of metal components in HCl were 4 ppb of Fe, 4 ppb of Na and 1 ppb of K.

Non-water-soluble solvent: 1,1-dichloro-1-fluoroethane (HCFC-141b). Contents of metal components in HCFC-141b were 3 ppb of Fe, 1 ppb or less of Na and 2 ppb or less of K.

Pure water: Pure water was obtained by the method mentioned above. Contents of metal components in pure water were 2 ppb of Fe, 0.7 ppb of Na and 0.2 ppb or less of K.

(2) Emulsion Preparation Step 1 (Pre-Emulsification)

A 5-liter beaker made of PFA was charged with 2,540 g of pure water, 114 g of emulsifying agent (ammonium perfluorooctanoate), 2,284 g of fluorine-containing monomer (PAVE), 22.7 g of iodine-containing monomer (IM), 12.7 g of pH control agent (ammonium carbonate) and 3.5 g of iodine compound (DI), followed by mixing for 60 seconds with an emulsifier (ULTRA-DISPERSER MODEL LK-41 available from Yamato Kagaku Kabushiki Kaisha), to give an emulsion pre-emulsified into 2 $\mu$m of volume average particle size.

(3) Emulsion Preparation Step 2 (Forced Emulsification)

The obtained pre-emulsified emulsion was immediately emulsified with a forced emulsifier (Microfluidizer Model M-210E/H available from Microfluidics International Corporation) at an emulsification pressure of 1,000 kgf/$cm^2$G to give an emulsion.

A particle size of the emulsion was measured with a particle size analyzer UPA9340 available from Nikkiso Kabushiki Kaisha. A volume average particle size thereof was 181 nm. The number of particles per 1 ml of water which can be calculated from the volume average particle size and an amount of PAVE contained in the emulsion was $1.55 \times 10^{14}$. pH of the emulsion was 8.9.

(4) Emulsion-Polymerization Step

A 6,000-milliliter stainless steel pressure resistive reactor was charged with 4,350 g of the obtained emulsion and 6.6 g of ammonium sulfite (hydrate). After the inside of the reactor was replaced with nitrogen gas sufficiently, a temperature thereof was adjusted to 15° C. with stirring and the reactor was evacuated, followed by increasing of the inside pressure up to 4.7 kgf/$cm^2$G with a fluorine-containing monomer (TFE) gas. When 5.4 ml of aqueous solution of 0.88% by weight polymerization initiator (APS) was introduced under pressure, immediately polymerization reaction began and lowering of pressure occurred. At the time when the pressure lowered down to 3.0 kgf/$cm^2$G, 59 g of TFE gas was introduced additionally to maintain the pressure at 3.0 kgf/$cm^2$G. After terminating the additional introduction, lowering of the pressure occurred, and at the time when the pressure lowered down to 2.0 kgf/$cm^2$G, 95 g of TFE gas was further introduced additionally to maintain the pressure at 2.0 kgf/$cm^2$G. After terminating the additional introduction, lowering of the pressure occurred, and at the time when the pressure lowered down to 1.0 kgf/$cm^2$G, 98 g of TFE gas was further introduced additionally to maintain the pressure at 1.0 kgf/$cm^2$G. When this additional introduction was terminated, pressure was released and the polymerization was terminated. During the polymerization, 5.4 ml each of aqueous solution of 0.88% by weight APS was introduced under pressure every three hours. As a result, 5,049 g of aqueous dispersion was obtained.

A polymerization time was 17 hours and 7 minutes. A solid content of the obtained aqueous dispersion was 23.2% by weight, pH was 8.3, a volume average particle size was 191 nm, and the number of particles per 1 ml of water which was calculated from the volume average particle size, solid content and amount of PAVE remaining when the polymerization was terminated was $1.34 \times 10^{14}$. Contents of metal components in the aqueous dispersion are shown in Table 1.

(5) Contaminants Removing Step

20 Kg of aqueous dispersion obtained in the same manner as in the above step (4) except that a scale of polymerization reaction was increased by 10 times, was diluted with 140 kg of water. A ceramic filter (available from U.S. FILTER CO., LTD., Filter length: 836 mm, Bore diameter: 200 nm, Multi-lumen (lotus root type) inner diameter: 4 mm diameter×12 bores, Number of filters: 10) having two tanks (300 liters) on both sides thereof was used, and the diluted aqueous dispersion was poured in one tank. Then a pressure inside the tank containing the diluted aqueous dispersion was raised with nitrogen gas up to 1.5 kgf/$cm^2$G and a pressure inside another tank was raised up to 1.3 kgf/$cm^2$G. The diluted aqueous dispersion was passed through the filter by that pressure differential to be filtrated. At the time when the whole aqueous dispersion was passed, setting of pressures of the both tank was reversed, and the aqueous dispersion was passed in the reverse direction. After the aqueous dispersion was condensed up to a specific concentration (content of elastomer: 6.0% by weight), 140 kg of water was again added. This filtration step was repeated five times over 21 hours. The calculated dilution was 612 times. An amount of the aqueous dispersion finally obtained after the cleaning was 84.3 liters, and the elastomer content was 6.0% by weight. An ammonium ion concentration measured with an ammonium ion meter was 77 ppm. A concentration of ammonium ion derived from the emulsifying agent which was calculated from the concentration of the filtrated solution was 67 ppm, and a concentration of other ammonium ion was 10 ppm.

Contents of metal components in the aqueous dispersion after the cleaning are shown in Table 1.

(6) Coagulation Step 19.3 G of the aqueous dispersion obtained in (5) after the cleaning was diluted with 0.7 g of water, and then added dropwise in 12 g of a coagulating agent (Suprapur available from MERCK & CO., INC.: 3.5% aqueous solution of HCl of semiconductor grade) to be coagulated. Thus a fluorine-containing elastomer containing water was obtained.

(7) Water Separation Step

The obtained fluorine-containing elastomer containing water was dipped in 14 g of a non-water-soluble solvent (HCFC-141b available from DAIKIN INDUSTRIES, LTD.) with stirring. Then water on the top layer and HCFC-141b were removed. This was repeated three times to remove water in the fluorine-containing elastomer containing water and un-reacted PAVE. Thus an elastomer swelled with the solvent was obtained. HCFC-141b was recovered in an amount of 46 g out of a totally used amount of 56 g. In the recovered solvent were contained 0.028 g of carboxylic acid converted from the emulsifying agent with the coagulating agent and further 1.225 g of un-reacted PAVE (1.290 g) in the polymerization step.

(8) Drying Step

The obtained elastomer containing the solvent was dried at 150° for 12 hours in an oven, the inside of which was adjusted to class 100 environment with heat resistant HEPA filter. Contents of metal components of the obtained polymer are shown in Table 1.

[Evaluation]

Firstly a method of analyzing contents of metal components which is used in the present invention is explained.

A metal content is measured finally in a liquid. Ultra pure water, dispersion, etc. are put directly in a flame-less atomic absorption spectrometer (Zeeman polarization atomic absorption spectrometer Z-8100 available from Hitachi, Ltd.) in an amount of 10 μl by using a micro-pipet, and then measurement is carried out. A detection limit of the measurement is shown in Table 1.

When a fluorine-containing polymer contains metal ingredients of not less than 1 ppm, firstly a solid is put in a platinum evaporating dish (purity of platinum: 99.9%), and after the polymer is subjected to ashing at 500° C. for 30 minutes in an electric oven, a slight amount of a remaining metal is dissolved in high purity hydrochloric acid (35%), and an absorbance is measured with a flame-less atomic absorption spectrometer.

When the metal content is a very small amount of not more than 1 ppm, measurement is made by a measuring method described in WO94/28394. Concretely a given amount of sample containing metals to be determined is subjected to ashing in a cuvette under the ashing conditions of an ashing temperature of about 1,000° C. and an ashing time of about 240 seconds, and then, absorbance thereof is measured as it is with a flame-less atomic absorption spectrometer.

Dilution of 23.5 g of the aqueous dispersion obtained in (4) above was carried out with 67.5 g of water to adjust the elastomer content to 6.0% by weight. Coagulation, dehydration and drying were carried out in the same manner as in (6) to (8) above except that this diluted aqueous dispersion was used. Thus an elastomer was obtained. An amount of ammonium ion extracted from the obtained elastomer was 751 ppb.

Also coagulation, dehydration and drying were carried out in the same manner as in (6) to (8) above except that 12 g of 3.5% aqueous solution of HCl of special grade reagent was used as a coagulating agent. Thus an elastomer was obtained. Metal contents of the obtained elastomer were 860 ppb of Fe, 1,070 ppb of Na and 150 ppb of K.

EXAMPLE 2

(Effect of Using Vessel Lined with PFA)

A 3-liter reactor having no ignition source and being equipped with a polymerization tank, the liquid-contacting parts (inside of tank, stirring blades sheath tube of thermometer) of which was lined with PFA in a thickness of 200 μm, was charged with 1.5 liters of water and 15 g of ammonium perfluorononanate ($C_8F_{17}COONH_4$). Then in order to remove oxygen from the inside of tank, pressurizing with TFE and exhausting were repeated with stirring. After adjusting the inside temperature of the tank to 50° C., perfluoro(methyl vinyl ether) (PMVE) and TFE were introduced under pressure to adjust the inside pressure to 8 $kgf/cm^2G$. A proportion of the mixed gas was adjusted to TFE/PMVE=1 (% by mole). A solution prepared by dissolving 30 mg of ammonium persulfate (APS) in 5 ml of pure water was introduced with pressurized $N_2$ to initiate polymerization. When the inside pressure of the tank was lowered to 7 $kgf/cm^2G$, 1,4-diiodoperfluorobutane was introduced under pressure and each gas of TFE and PMVE was additionally introduced at a ratio of TFE/PMVE=62/38 (% by mole) to elevate up to the initial pressure. Thereafter every time when the pressure was lowered to 7 $kgf/cm^2G$, the same procedures were repeated to raise the pressure. Further introduction of a solution prepared by dissolving 10 mg of APS in 5 ml of pure water with pressurized $N_2$ was repeated every three hours, and 15 hours after, un-reacted gas was exhausted to terminate the polymerization. A content of elastomer of the obtained aqueous dispersion was 27.1%, and pH thereof was 2.5. Metal contents of the obtained aqueous dispersion were 70 ppb of Fe, 4 ppb of Na and 2 ppb or less of K. Contents of metal components of the obtained polymer are shown in Table 1.

The polymerization was carried out in the same manner as above except that a stainless steel polymerization tank was used. A content of elastomer of the obtained aqueous dispersion was 26.8%, and pH thereof was 2.7. Metal contents of the obtained aqueous dispersion were 250 ppb of Fe, 10 ppb of Na and 6 ppb of K.

EXAMPLE 3

(Another Method of Cleaning Aqueous Dispersion)

60 G of the aqueous dispersion obtained in (4) of Example 1 was put in a gel cellophane semi-permeable membrane. After the semi-permeable membrane was dipped in 6 liters of pure water for 24 hours, water was changed to new one. Those steps were repeated 10 times. Ammonium ion in the aqueous dispersion which was measured with an ammonium ion meter was 40 ppb.

The obtained aqueous dispersion was treated in the same manner as in (6) to (8) of Example 1 to give 13 g of dried elastomer. An amount of ammonium ion extracted from the elastomer was 80 ppb.

TABLE 1

| | Content of metal component (ppb) | | | | | | | | | | $NH_4^+$ |
|---|---|---|---|---|---|---|---|---|---|---|---|
| | Fe | Na | K | Cr | Ni | Cu | Ca | Mg | Zn | Al | (ppm) |
| Materials | | | | | | | | | | | |
| Ultra pure water | 2 | 0.7 | <0.2 | <0.1 | <0.1 | <0.1 | <0.1 | <0.1 | <0.1 | <0.1 | — |
| Emulsifying agent | 8100 | 600 | 200 | — | — | — | — | — | — | — | — |

TABLE 1-continued

|  | Content of metal component (ppb) | | | | | | | | | | $NH_4^+$ (ppm) |
|---|---|---|---|---|---|---|---|---|---|---|---|
|  | Fe | Na | K | Cr | Ni | Cu | Ca | Mg | Zn | Al |  |
| HCl (for semiconductor) | 4 | 4 | 1 | — | — | — | — | — | — | — | — |
| HCl (special grade reagent) | 70 | 790 | 160 | — | — | — | — | — | — | — | — |
| HCFC-141b | 3 | <1 | <2 | <1 | <1 | <1 | <1 | <1 | <2 | <5 | — |
| Emulsified dispersion |  |  |  |  |  |  |  |  |  |  |  |
| Dispersion after emulsion polymerization (Example 1) | 120 | 3 | <2 | 15 | 8 | 75 | <1 | <1 | 27 | <5 | 3370 |
| Dispersion after cleaning (Example 1) | 270 | 14 | 6 | 18 | 26 | 120 | <1 | 8 | 70 | <5 | 77 |
| Dispersion when polymerization tank is lined with PFA (Example 2) | 70 | 4 | <2 | — | — | — | — | — | — | — | — |
| Detection limit of dispersion | <1 | <1 | <2 | <1 | <1 | <1 | <1 | <1 | <2 | <5 | — |
| Polymer obtained by using HCl of semiconductor grade (Example 1) | 440 | 4 | <5 | 38 | 20 | 360 | 8 | 15 | 50 | 5 | — |

Unit: ppb    —: Not measured

EXAMPLE 4

(1) Emulsion Polymerization Step

A 6,000-milliliter pressure resistant stainless steel reactor was charged with 2 liters of ultra pure water, 20 g of emulsifying agent ($C_7F_{15}COONH_4$) and 18 g of pH control agent (ammonium carbonate). After replacing inside of the reactor with nitrogen gas sufficiently, the reactor was heated up to 50° C. with stirring at 600 rpm and a mixture of tetrafluoroethylene and perfluoro(methyl vinyl ether) (TFE/PMVE=20/80, mole ratio) was introduced under pressure so that the inside pressure became 12.0 kgf/cm²G. When 2 ml of aqueous solution of 186 mg/ml ammonium persulfate (APS) as a polymerization initiator was introduced with pressurized nitrogen, immediately a polymerization reaction started and lowering of the inside pressure occurred. When the pressure lowered down to 11.0 kgf/cm²G, 4.0 g of diiodine compound $I(CF_2)_4I$ was introduced under pressure. Then 19.0 g of TFE was fed with its self-pressure and 23.0 g of PMVE was fed under pressure with a plunger pump. In that manner, raising and lowering of the pressure were repeated. At the time when a total amount of TFE and PMVE reached 430 g, 511 g, 596 g and 697 g, respectively, 1.5 g each of iodine compound $ICH_2CF_2CF_2OCF=CF_2$ was introduced. During the polymerization, every 12 hours after initiating the reaction, 2 ml of aqueous solution of 35 mg/ml APS was introduced with pressurized nitrogen gas.

Thirty-four hours after starting of the polymerization reaction, when a total amount of TFE and PMVE reached 860 g, the autoclave was cooled and un-reacted monomer was released to give an aqueous dispersion having a solid content of 30.0% by weight.

(2) Coagulation Step

Dilution of 4.0 g of the aqueous dispersion obtained in (1) above was carried out with 15.7 g of ultra pure water, and the diluted aqueous dispersion was added dropwise in 12 g of a coagulating agent (Suprapur available from MERCK & CO., INC.: Aqueous dispersion of 3.5% HCl of semiconductor grade) in a beaker made of PFA to carry out coagulation. Thus a fluorine-containing elastomer containing water was obtained.

(3) Drying Step

The obtained elastomer containing a solvent was put on a fluorine-containing resin (PFA) film and was dried at 150° C. for 12 hours in an oven, the inside of which was adjusted to class 100 environment with heat resistant HEPA filter. A Mooney viscosity (ML1+10(100° C.)) of the obtained elastomer was 61. As a result of $^{19}$F-NMR analysis, a proportion of monomer units of the elastomer was TFE/PMVE=60.3/39.7 and a content of iodine was 0.31% by weight.

Metal contents of the obtained elastomer were determined in the same manner as in Example 1. As a result, metal contents were Fe=80 ppb, Cr=10 ppb, Ni=10 ppb, Cu=100 ppb, Na=560 ppb, K=200 ppb, Ca=70 ppb, Mg=80 ppb, Zn=40 ppb and Al=140 ppb. The total metal content was 1,290 ppb.

EXAMPLE 5

Four kinds of crosslinkable elastomer compositions were prepared with components shown in Table 2 by using the cleaned fluorine-containing elastomer obtained in Example 4. All the fillers used have a reduced metal content. The elastomer compositions were subjected to press-crosslinking (primary crosslinking) at 160° C. for 10 minutes and then crosslinking (secondary crosslinking) in an oven at 180° C. for four hours to give O-rings (AS-568A-214).

Then the O-rings were subjected to the following washing. (Washing with $H_2SO_4/H_2O_2$ mixture solution).

The O-rings (AS-568A-214) were washed with $H_2SO_4/H_2O_2$ mixture solution (1/1) at 100° C. for 15 minutes, and then with 50% aqueous solution of HF at 25° C. for 15 minutes. After that, the O-rings were further washed with ultra pure water at 100° C. for two hours, and then heated at 180° C. for 24 hours in a high purity nitrogen gas stream of 20 ml/min (volume: 40×40×40 cm) to remove water therefrom. Physical properties in normal state (25° C.) and compression set of those O-rings were measured according to JIS K6301. The results are shown in Table 2. Metal contents of the obtained final products were determined. The results are shown in Table 3.

TABLE 2

| | Fluorine-containing elastomer composition | | | |
|---|---|---|---|---|
| | A (transparent) | B (black) | C (white) | D (milky white) |
| Fluorine-containing elastomer[1] (g) | 100 | 100 | 100 | 100 |
| TAIC[2] (g) | 2.0 | 2.0 | 2.0 | 2.0 |
| PERHEXA 2.5B[3] (g) | 0.5 | 0.5 | 0.5 | 0.5 |
| TOKABLACK[4] (g) | — | 10.0 | — | — |
| 1-FX[5] (g) | — | — | 10.0 | — |
| LUBRON LSF[6] (g) | — | — | — | 25.0 |
| Physical properties in normal state (25° C.) | | | | |
| 100% tensile stress (MPa) | 1.7 | 9.1 | 7.0 | 4.4 |
| Tensile strength (MPa) | 10.2 | 22.1 | 20.8 | 18.0 |
| Elongation (%) | 300 | 250 | 240 | 200 |
| Hardness (Shore A) | 65 | 82 | 77 | 70 |
| Compression set (%) | | | | |
| 70 Hours at 200° C. | 13 | 13 | 17 | 15 |

[1]TFE/PMVE/IM copolymer
[2]Triallylisocyanurate
[3]2,5-dimethyl-2,5-di-(t-butylperoxy)hexane available from NOF Corporation
[4]Graphitized carbon black TOKABLACK #3885 available from TOKAI CARBON KABUSHIKI KAISHA
[5]Ultra high purity spheroidal synthetic quartz silica available from KABUSHIKI KAISHA TATSUMORI
[6]Low molecular weight PTFE available from DAIKIN INDUSTRIES, LTD.

TABLE 3

| | Content (ppm) | | | |
|---|---|---|---|---|
| Metal | A | B | C | D |
| Fe | 1.0 | 3.0 | 0.3 | 0.3 |
| Cr | 0.1 | 0.5 | 2.0 | 0.1 |
| Ni | 0.1 | 2.0 | 0.3 | 0.1 |
| Cu | 0.1 | 1.0 | 8.0 | 0.1 |
| Na | 0.9 | 2.0 | 2.0 | 1.0 |
| K | 0.2 | 5.0 | 3.0 | 0.9 |
| Ca | 0.4 | 10.0 | 5.0 | 0.2 |
| Mg | 0.2 | 4.0 | 1.0 | 0.2 |
| Al | 0.1 | 9.0 | 2.0 | 0.6 |

With respect to the obtained final products, i.e. O-rings, metal extraction was determined according to the method mentioned below. The results are shown in Tables 4 and 5. It is only when both of the polymer and filler are cleaned that an amount of metals in the molded article itself can be reduced.

(1) A chemical solution for extraction is put in a PFA vessel (with a lid) previously washed sufficiently.

(2) A chemical solution ($H_2SO_4/H_2O_2$ (4/1) or 50% HF) to be used is of semiconductor grade.

(3) Sample O-rings are dipped in the respective chemical solutions (at 25° C. for 14 days in case of $H_2SO_4/H_2O_2$ mixture, at 25° C. for 24 hours in case of 50% HF), and are allowed to stand at the specified temperature after sealing of the vessel. In that case, a vessel containing only a chemical solution without dipping a sample is a control.

(4) After allowing to stand for an optional period of time, metal contents in the chemical solution are measured with ICP-MS (SPQ9000 available from Seiko Denshi Kabushiki Kaisha) for the $H_2SO_4/H_2O_2$ mixture solution and with atomic absorption spectrometer (Z-8000 available from Hitachi, Ltd.) for 50% HF.

(5) Amounts of metals extracted from the O-rings are calculated from the following equation.

$$\text{Amount of extracted metal} = \frac{\left\{\begin{array}{l}(\text{Metal concentration in chemical solution with dipping O-ring}) - \\ (\text{Metal concentration in chemical solution without dipping O-ring})\end{array}\right\}}{(\text{Weight of O-ring}) \times (\text{Weight of chemical solution})}$$

Table 4 shows amounts of metals extracted in $H_2SO_4/H_2O_2$ mixture solution and Table 5 shows amounts of metals extracted in 50% HF.

TABLE 4

| | Amount of extraction (ppb) | | | | Detection |
|---|---|---|---|---|---|
| Metal | A | B | C | D | limit (ppb) |
| Fe | 10 | 20 | 10 | 10 | 5 |
| Ni | 40 | ND | 10 | 400 | 0.9 |
| Cu | 3 | 2 | 8 | 2 | 0.1 |
| Na | 1 | 30 | 10 | 5 | 0.2 |
| K | ND | ND | ND | ND | 10 |
| Ca | ND | ND | ND | ND | 5 |
| Mg | 20 | 4 | 4 | 4 | 0.1 |
| Al | 3 | 2 | 4 | 10 | 0.1 |

TABLE 5

| | Amount of extraction (ppb) | | | | Detection |
|---|---|---|---|---|---|
| Metal | A | B | C | D | limit (ppb) |
| Fe | 5.0 | 50.0 | 20.0 | 9.0 | 5 |
| Cr | 3.0 | ND | 3.0 | 2.0 | 2 |
| Ni | ND | ND | ND | ND | 4 |
| Cu | ND | ND | ND | ND | 0.1 |
| Na | 1.0 | ND | 2.0 | 1.0 | 0.5 |
| K | ND | ND | ND | 1.0 | 0.7 |
| Ca | ND | 7.0 | 20.0 | 30.0 | 7 |

TABLE 5-continued

| Metal | Amount of extraction (ppb) | | | | Detection limit (ppb) |
| --- | --- | --- | --- | --- | --- |
|  | A | B | C | D |  |
| Mg | 1.0 | 20.0 | 7.0 | 1.0 | 0.2 |
| Zn | 30.0 | 20.0 | 30.0 | 8.0 | 0.6 |
| Al | ND | ND | ND | ND | 2 |

EXAMPLE 6

(1) Emulsion Polymerization Step

A 3-liter stainless steel autoclave having no ignition source was charged with one liter of pure water, 10 g of $CF_3CF_2CF_2OCF(CF_3)CF_2OCF(CF_3)COONH_4$ as an emulsifying agent, and 9 g of ammonium carbonate as a pH control agent. After replacing inside of the system with nitrogen gas sufficiently and degassing, the autoclave was heated up to 50° C. with stirring at 600 rpm and a mixture of tetrafluoroethylene (TFE) and perfluoro(methyl vinyl ether) (PMVE) (TFE/PMVE=25/75, mole ratio) was introduced so that the inside pressure became 8.0 kgf/cm²G. A 10 ml of aqueous solution of 34.3 mg/ml ammonium sulfite and a 10 ml of aqueous solution of 135 mg/ml ammonium persulfate (APS) were introduced separately in that order with pressurized nitrogen to initiate a reaction.

When the inside pressure lowered to 7.0 kgf/cm²G with advance of the polymerization, 3 g of $CF_2=CFOCF_2CF(CF_3)OCF_2CF_2CN$ (CNVE) was introduced with pressurized nitrogen. Then TFE and PMVE were introduced at a ratio of 4.7 g/5.3 g with a self-pressure thereof so that the pressure became 8.0 kgf/cm²G. Thereafter with advance of the reaction, TFE and PMVE were introduced under pressure in the same manner, and raising and lowering of the pressure were repeated between 7 kgf/cm²G and 8 kgf/cm²G. Also 2.5 hours after and 5 hours after, a 10 ml of aqueous solution of 34.3 mg/ml ammonium sulfite and a 10 ml of aqueous solution of 13.5 mg/ml APS were introduced separately in that order with pressurized nitrogen.

Eight hours after starting of the polymerization, when a total amount of TFE and PMVE reached 70 g, the autoclave was cooled and un-reacted monomer was released to give 1,130 g of aqueous dispersion having a solid content of 6.1% by weight.

(2) Coagulation Step

Out of the aqueous dispersion obtained in (1) above, 1,000 g was diluted with 3,000 g of water and added gradually in 2,400 g of aqueous solution of 3.5% by weight hydrochloric acid with stirring. After the addition, stirring was continued for five minutes, and then a coagulated product was filtrated.

(3) Water Separation Step

The obtained fluorine-containing elastomer containing water was put in 1 kg of HCFC-141b and stirred for five minutes, followed by filtrating again. Thereafter washing with HCFC-141b and filtration were further repeated four times.

(4) Drying Step

The fluorine-containing elastomer was subjected to vacuum-drying at 60° C. for 72 hours to give 58 g of elastomer.

As a result of $^{19}FNMR$ analysis, a proportion of monomers of the elastomer was TFE/PMVE/CNVE=57.3/41.5/1.2% by mole.

Contents of metal components of the elastomer were determined in the same manner as in Example 1, and the results were Fe=180 ppb, Cr=30 ppb, Ni=1,100 ppb, Cu=260 ppb, Na=1,760 ppb, K=340 ppb, Ca=350 ppb, Mg=160 ppb, Zn=240 ppb and Al=30 ppb. A total content was 4,450 ppb.

INDUSTRIAL APPLICABILITY

According to the present invention, contents of metal components of the fluorine-containing elastomer can be reduced substantially from the inside thereof, and further it is possible to provide a molded article produced from the fluorine-containing elastomer having sufficiently reduced contents of metal components.

What is claimed is:

1. A method of reducing a metal content of a fluorine-containing elastomer through preparation thereof by substantially reducing, from inside of the fluorine-containing elastomer, a content of metal remaining after ashing, in which the elastomer is prepared by using materials containing substantially no metal component as all the materials used for polymerization of a fluorine-containing monomer, coagulation and drying, by employing an equipment, a part of which comes into contact with an emulsion, emulsified dispersion or coagulated fluorine-containing elastomer containing water and is made of or lined with fluorine-containing resin or polyethylene resin, and by drying with a clean gas.

2. A method of reducing a metal content of a fluorine-containing elastomer through preparation thereof by substantially reducing, from inside of the fluorine-containing elastomer, a metal content remaining after ashing, in which the elastomer is prepared by using materials containing substantially no metal component as all the materials used for polymerization of a fluorine-containing monomer, coagulation and drying, by carrying out emulsion-polymerization of the fluorine-containing elastomer while maintaining an emulsion in a weak alkaline state, by carrying out coagulation of an emulsified dispersion of the fluorine-containing elastomer by using an acid containing no metal element, and by employing an equipment, a part of which comes into contact with an emulsion, emulsified dispersion or coagulated fluorine-containing elastomer containing water and is made of or lined with a fluorine-containing resin or polyethylene resin.

3. A method of reducing a metal content of a fluorine-containing polymer through preparation thereof, in which an equipment which is lined with a fluorine-containing resin or polyethylene resin on its part coming into contact with materials for polymerization and a product polymer is used.

4. The method of reducing a metal content of the fluorine-containing polymer of claim 3, wherein the equipment lined with a fluorine-containing resin is a polymerizing equipment such as a polymerization vessel and agitation blades and baffle plates thereof, coagulation equipment, washing equipment, drying equipment or pipes thereof.

5. The method of reducing a metal content of the fluorine-containing polymer of claim 3, wherein the fluorine-containing resin is tetrafluoroethylene/perfluoro(alkyl vinyl ether) copolymer.

* * * * *